United States Patent Office 3,320,208
Patented May 16, 1967

3,320,208
OXYALKYLATED CYCLIC RESINS
Franklin E. Mange, St. Louis, Mo., assignor to Petrolite Corporation, Wilmington, Del., a corporation of Delaware
No Drawing. Filed Sept. 14, 1962, Ser. No. 223,800
9 Claims. (Cl. 260—47)

This invention relates to oxyalkylated m-dioxane polymers such as the derivatives of the reaction product of (1) phenolic compounds and/or polyols and (2) unsaturated dioxanes (hereafter also referred to as "polymeric dioxanes"); and to the uses thereof.

It is known that pentaerythritol reacts with unsaturated aldehydes to form acetals. For example, when an unsaturated aldehyde such as acrolein is reacted with pentaerythritol, the following reaction occurs:

(I)

$C(CH_2OH)_4 + CH_2=CHCHO \longrightarrow$ $$CH_2=CH-CH \begin{matrix} OCH_2 \\ OCH_2 \end{matrix} C \begin{matrix} CH_2O \\ CH_2O \end{matrix} HC-CH=CH_2$$

3,9-divinyl spirobi (m-dioxane)

and (II)

$$CH_2=CH-CH \begin{matrix} O-CH_2 \\ O-CH_2 \end{matrix} C \begin{matrix} CH_2OH \\ CH_2OH \end{matrix}$$

2-vinyl-5,5-bis(hydroxymethyl)-m-dioxane

These products are formed along with other products including polymeric condensates.

These can also be prepared from aldehydes of the formula $$R_2CH=\underset{R_1}{\overset{|}{C}}-CHO$$

to yield, among other products and condensates, $$R_2CH=\underset{R_1}{\overset{|}{C}}-C \begin{matrix} OCH_2 \\ OCH_2 \end{matrix} C \begin{matrix} CH_2O \\ CH_2O \end{matrix} C-\underset{R_1}{\overset{|}{C}}=CHR_2$$

and $$R_2CH=\underset{R_1}{\overset{|}{C}}-CH \begin{matrix} OCH_2 \\ OCH_2 \end{matrix} C \begin{matrix} CH_2OH \\ CH_2OH \end{matrix}$$

where $R_1$ is halogen, hydrogen, alkyl, etc. and $R_2$ is hydrogen, alkyl, etc.

Compounds I and II can be further reacted with certain phenolic compounds to form phenol-m-dioxane polymers.

Thus, when phenol reacts with I, the hydrogens indicated on phenolic ring by Ⓗ

[phenol with Ⓗ markers at ortho, ortho, and para positions]

can add across the double bond of unsaturated m-dioxanes in a number of ways, one of which is as follows:

[Ⓗ–phenol(OH)–CH₂CH–CH(OCH₂/O–CH₂)C(CH₂–O/CH₂–O)CH–CH₂CH₂–phenol(OH)–Ⓗ]

The encircled phenolic ring hydrogens can further add across the double bonds of Compound I to form phenol-m-dioxane polymers.

Similar polymers can be prepared from phenolic compounds and Compound I or from phenolic compounds and mixtures of I and II.

When a p-substituted phenol such as a p-alkyl phenol which contains two reactive positions is condensed with Compound I under acid conditions, a resinous product is formed which is believed to contain the following structural unit:

[structural diagram of p-R-phenol linked via -CH₂CH₂CH- to spiro m-dioxane core, linked via -CHCH₂CH₂- to another unit]

Related types of resins can also be formed from polyaromatic phenols for example, those having two phenolic groups as exemplified by the following:

[HO-C₆H₄-C(CH₃)₂-C₆H₄-OH]
Bis phenol-A

[HO-C₆H₄-CH₂-C₆H₄-OH]
Dihydroxy diphenylmethane (any of the isomers or mixtures thereof) in particular the 4,4′-isomer

[HO-C₆H₄-CH₂CH₂-C₆H₄-OH]
1,2-bis-(p-hydroxyphenyl) ethane

[2-hydroxy-5-methylphenyl linked by CH₂ to 4′-hydroxy-2′-methylphenyl]
2-hydroxy-5-methylphenyl-2′-methyl-4′-hydroxyphenyl methane

[HO-C₆H₄-C(CH₃)₂-C₆H₄-OH]
2,2-bis(p-hydroxyphenyl) propane

[Methylenebis-(3,5-xylenol) structure]
Methylenebis-(3,5-xylenol)

[HO-C₆H₄-CH(C₃H₇)-C₆H₄-OH]
Butylidenebisphenol

[HO-C₆H₄-C₆H₄-OH]
Bisphenol

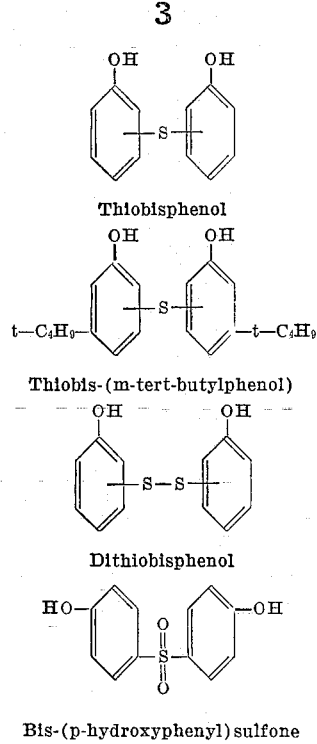

Thiobisphenol

Thiobis-(m-tert-butylphenol)

Dithiobisphenol

Bis-(p-hydroxyphenyl) sulfone

In addition, polymers can be prepared from higher phenols, for example phenol-aldehyde resins, for example

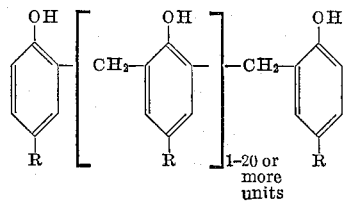

where R is hydrogen or a substituted group, provided the phenolic resin has an average functionality of at least 2. Other examples of phenol-aldehyde resins suitable herein are described in U.S. Patent 2,499,365 which is by reference incorporated into the present application.

m-Dioxane polymers can also be prepared by reacting polyols with unsaturated dioxanes, as exemplified by the following reaction:

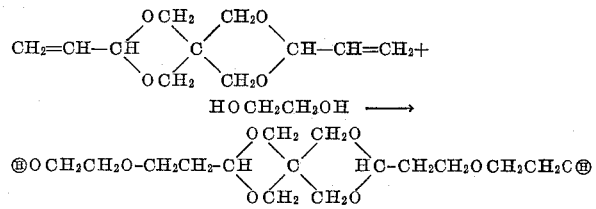

and/or a polymer unit

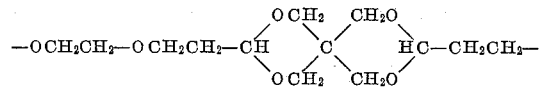

The encircled H hydrogens can further add across the double bond of additional vinyl psirobi compounds to form polymeric materials.

Similar polymers can be prepared from polyols and Compound I or from polyols and mixtures of Compound I and II.

It should be understood that the above formulae are idealized presentations and do not necessarily represent all of the reactions taking place. Accordingly, the applicant does not wish to be bound by the specific formulae presented herein.

A wide variety of polyols can be employed in this invention for example those described by the formula $B(OH)_n$ where B represents the non-hydroxyl moiety of the polyol and $n$ represents the number of hydroxy groups contained therein, such as where $n$ is, for example, at least 2, for example 2–10, but preferably 2–6. In general, B is a hydrocarbon group, preferably aliphatic, and most preferably alkylene. In addition, B may contain other elements besides carbon and hydrogen, for example oxygen, etc. Thus B may contain alkylene ether groups, carbonyl groups, carboxylic acid groups, carboxylic ester groups, etc. In addition, $B(OH)_n$ may be oxyalkylated prior to reaction to yield $$B[-(OA)_a-OH]_n$$

where $-(OA)_a-$ represents repeating polyoxyalkylene units.

Polyols also include glycerol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol, and ducitol; and polyhydroxy-carboxylic acids such as tartaric acid, mucic acid, saccharic acid, gluconic acid, glucuronic acid, gluconic acid, mannonic acid, trihydroxyglutaric acid, glyceric acid, carboxylic oxidation products of polyglycerols, etc.

The polyols may be esterified or etherified provided the reacted products contain at least 2 hydoxy groups capable of adding across the double bond on the polymeric dioxane.

Examples of such etherified and esterified polyols include partially esterified or partially etherified, sugars and sugar alcohols such as monolauric acid ester of sucrose, monostearic acid ester of dextrose, monopalmitic acid ester of mannitol, dicaproic acid ester of maltose, monooctyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, monolauryl ether of glycerol, dicetyl ether of glycerol, etc.

Generally speaking, one may select many different types of acids capable of being esterified with the polyols, principally compounds having lipophile radicals of relatively high molecular weight. For example, the following materials may be utilized as sources of lipophile groups: hydroaromatic acids such as naphthenic acid, abietic acid, hydroxy aromatic acids such as hydroxy benzoic acid, fatty acids such as butyric acid, caprylic acid, caproic acid, capric acid, saturated and unsaturated higher aliphatic acids such as the higher fatty acids containing at least eight carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, and carnauba wax and carboxylic acids derived, by oxidation and other methods, from petroleum.

Corresponding alcohols can be employed in preparing ethers thereof.

A class of polyols utilizable in this invention include hexitans and hexides obtained by dehydrating sorbitol, and certain polyoxylalkylenes, such as the polyoxyethylene and derivatives thereof. These compounds are known as "Spans" and "Tweens," which are manufactured by the Atlas Powder Company, Wilmington, Delaware. According to the manufacture's literature, these esters are prepared by first dehydrating sorbitol to produce a mixture of hexitans and hexides having the following formulae:

(1) 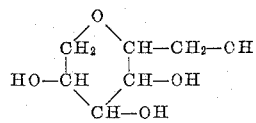

(2) 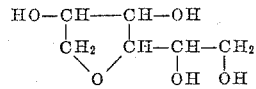

(3) 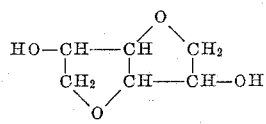

This mixture of hexitans and hexides is then esterified by reacting it with one or more moles of a fatty acid to form the Spans. The Tweens are similar thereto except that the unesterified hydroxy groups in the hexitans and hexides have polyoxyethylene chains added thereto. Nonlimiting examples of the esters contemplated herein are sorbitol anhydride monolaurate, sorbitol anhydride monomyristate, sorbitol anhydride monopalmitate, sorbitol anhydride monostearate, sorbitol anhydride monooleate, sorbitol anhydride monolinoleate, and polyoxyethylene derivatives of the foregoing monoesters. Further data on the monoesters utilizable herein are attainable in a brochure entitled "Atlas Surface Active Agents" published in 1948 by the manufacturers, supra. Reference should be made thereto, and it is considered to be a part of this specification.

Examples of representative commerical cyclic polyols are presented in the following table.

TABLE I
$[RCO-]_n$ ⓟ$[-(CH_2CH_2O)_xH]_z$    ⓟ=Hydrogenated furan, pyran or condensed furan ring

| n | z | x | $\overset{O}{\underset{RC-}{\parallel}}$ | Commercial Name |
|---|---|---|---|---|
| 1 | 3 | 2 | Lauryl | Tween 21 |
| 1 | 3 | 2 | Stearyl | Tween 61 |
| 1 | 3 | 2 | Oleyl | Tween 81 |
| 3 | 3 | 10 | Oleyl | Tween 85 |
| 3 | 3 | 10 | Stearyl | Tween 65 |
| 1 | 3 | 10 | Stearyl | Tween 60 |
| 1 | 3 | 10 | Oleyl | Tween 80 |
| 1 | 3 | 0 | Lauryl | Span 20 |
| 1 | 3 | 0 | Palmitic | Span 40 |
| 1 | 3 | 0 | Stearyl | Span 60 |

In summary, the polymeric dioxanes which can be oxyalkylated according to this invention include the following:

(A) the compound formed by reacting an acrolein or an analogous compound, for example of the formula

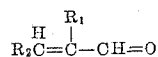

where $R_2$=halogen, hydrogen, alkyl and $R_2$=H or alkyl) with pentarythritol.

These reactants form (I) $R_1$ and $R_2$ substituted 3, 9-divinyl spirobi (m-dioxane) and (II) $R_1$ and $R_2$ substituted 2-vinyl 5,5-bishydroxymethyl (m-dioxane). These can be polyermized by (1) further reaction of the hydroxy group of II across the double bond and/or (2) by interaction of the pentraerythritol reactant across the double bond (Polymer A).

(B) The polymeric m-dioxanes formed from reacting compounds of type I and/or II with phenolic compounds.

(C) The polymeric m-dioxanes formed by reacting Polymer A with phenolic compounds.

(D) The polymeric m-dioxanes formed by reacting compounds of Type I and/or II with polyols.

(E) The polymeric m-dioxane formed by reacting Polymer A with polyols.

(F) The polymeric m-dioxane formed by reacting compounds of Type I and/or II with both phenolic compounds and polyols.

(G) The polymeric m-dioxanes formed by reacting Polymer A with both polyols and phenolic compounds.

In other words, polymeric dioxanes are formed by reacting an unsaturated m-dioxane having at least one

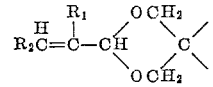

group, but preferably of the formula

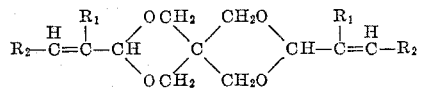

and a phenolic compound and/or a polyol (each having a functionality of at least 2) capable of adding across the double bond of the unsaturated dioxanes.

Non-limiting examples of polymeric dioxanes can be found in "pentaerythritols" ACS Monogram Series No. 136 (Reinhold) Berlow et al., pages 174–176, and in the references referred to therein, as well as in the following U.S. Patents: 2,687,407; 2,915,492; 2,915,499; 2,915,500–1.

These, as well as other polymer dioxanes, can be oxyalkylated according to the present invention.

The following are nonlimiting representative examples of resins prepared from an alkylphenol and 3,9-dialkenyl spirobi (m-dioxane).

*Example A*

A resin was prepared from the following materials:

p-Tert-butyl phenol _____pounds__ 23.3
3,9-divinylspirobi (m-dioxane) _____do____ 22.0
Aromatic solvent _____do____ 40.0
p-Toluene sulfonic acid _____grams__ 46.0

The above materials were combined at room temperature. The stirred mixture was heated to 80–85° C. and held at this temperature for four hours to form the resin. This represents a molar ratio of the phenol to divinylspirobi (m-dioxane) of 3:2.

To this resin solution was added 3.5 pounds of a 50% aqueous solution of sodium hydroxide. The resultant mixture was heated to 150° C. and held at this temperature for three hours, during which period, water of reaction and water from the sodium hydroxide solution was removed.

This basic resin was oxyalkylated as described in latter examples.

*Example B*

A resin was prepared using the following materials:

p-Tert-butyl phenol _____pounds__ 16.5
3,9-divinylspirobi (m-dioxane) _____do____ 17.5
Aromatic solvent _____do____ 34.0
p-Toluene sulfonic acid _____grams__ 29.0

The above materials were combined at room temperature. The stirred mixture was heated to 90° C. and held at 80–90° C. for four hours to form the resin. This represents a molar ratio of the phenol to divinylspirobi (m-dioxane) of 4:3.

To this resin solution was added 2.0 pounds of a 50% aqueous solution of sodium hydroxide. The resultant mixture was heated at 150° C. and held at this temperature for two hours, during which period, water of reaction and water from the sodium hydroxide solution was removed.

This basic resin was oxyalkylated as described in latter examples.

Example C

A resin was prepared using the following materials:

| | |
|---|---|
| p-Tert-butyl phenol | pound__ 11.3 |
| 3,9-dipropenylspirobi (m-dioxane) | do____ 12.0 |
| Aromatic solvent | do____ 25.0 |
| p-Toluene sulfonic acid | grams__ 27.0 |

The above materials were combined at room temperature. The stirred mixture was heated to 80–85° C. and held at this temperature for four hours to form the resin. This represents a molar ratio of the phenol to dipropenylspirobi (m-dioxane) of 3:2.

To this resin solution was added 1.6 pounds of a 50% aqueous solution of sodium hydroxide. The resultant mixture was heated to 150° C. and held at this temperature for three hours, during which period, water of reaction and water from the sodium hydroxide solution was removed.

This basic resin was oxyalkylated as described in latter examples.

Example D

A resin was prepared using the following materials:

| | |
|---|---|
| p-Tert-butylphenol | pounds__ 10.3 |
| 3,9-dipropenylspirobi (m-dioxane) | do____ 12.3 |
| Aromatic solvent | do____ 25.0 |
| p-Toluene sulfonic acid | grams__ 24.6 |

The above materials were combined at room temperature. The stirred mixture was heated to 80–85° C. and held at this temperature for four hours to form the resin. This represents a molar ratio of the phenol to dipropenylspirobi (m-dioxane) of 4:3.

To this resin solution was added 1.4 pounds of a 50% aqueous solution of sodium hydroxide. The resultant mixture was heated to 150° C. and held at this temperature for three hours, during which period water of reaction and water from the sodium hydroxide solution was removed.

This basic resin was oxyalkylated as described in latter examples.

The following are nonlimiting examples of resins prepared from polyols.

Example E

A resin was prepared from the following materials:

| | |
|---|---|
| Polypropylene glycol (400 aver. mol. wt.) | pounds__ 36.0 |
| 3,9-divinylspirobi (m-dioxane) | do____ 14.4 |
| Aromatic solvent | do____ 50.0 |
| p-Toluene sulfonic acid | grams__ 35.0 |

The above materials were combined at room temperature. The stirred mixture was heated to 80° C. and held at about this temperature for four hours to form the resin. This represents a molar ratio of the glycol divinylspirobi (m-dioxane) of 4:3.

To this resin solution was added 2.0 pounds of a 50% aqueous solution of sodium hydroxide. The resultant mixture was heated to 150° C. and held at this temperature for two hours during which period water of reaction and water from the sodium hydroxide solution was removed.

The basic resin was oxyalkylated as described in latter examples.

Example F

A resin was prepared from the following materials:

| | |
|---|---|
| Polyethylene glycol (600 aver. mol. wt.) | pounds__ 24.0 |
| p-Tert-amyl phenol | do____ 6.6 |
| 3,9-divinylspirobi (m-dioxane) | do____ 12.7 |
| Aromatic solvent | do____ 40.0 |
| p-Toluene sulfonic acid | grams__ 29.9 |

The above materials were combined at room temperature. The stirred mixture was heated to 80° C. and held at 80–90° C. for four hours to form the resin. This represents a molar ratio of glycol to phenol to 3,9-divinylspirobi (m-dioxane) of 2 to 2 to 3.

To this solution was added 1.7 pounds of a 50% aqueous solution of sodium hydroxide. The resultant mixture was heated to 150° C. and held at this temperature for two hours during which period, water of reaction and water from the sodium hydroxide solution was removed.

The basic resin was oxyalkylated as described in latter examples.

OXYALKYLATION

The m-dioxane polymer is oxyalkylated in any suitable manner with any suitable $\alpha,\beta$ alkylene oxide, for example, alkylene oxides of the formula:

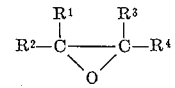

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc. The polyoxyalkylene group is represented by $(OA)_n$ when $n$ represents the number of oxide units and $A$ is the group

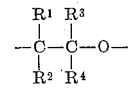

The oxyalkylene chain is most probably terminated by OH and the m-dioxane group.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

Furthermore, $—(AO)_n—$ denotes (1) homo units for example $—(EtO)_n—)$, $—(PrO)_n—$, $—(BuO)_n—$, $—(octyl\ O)_n—$,

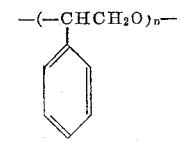

etc., (2) block units, $$—(EtO)_a—(PrO)_b—$$
$$—(EtO)_a—(BuO)_b—$$
$$—(PrO)_a—(EtO)_b—(PrO)_c—$$
$$—(EtO)_a—(PrO)_b—(BuO)_c—$$
$$—(EtO)_a$$

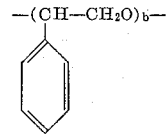

etc. where $a+b+c=n$; (3) heteric units containing random mixtures of more than one oxide $—(EtO—PrO)_n—$, $—(PrO—BuO)_n—$, $—(EtO—BuO)_n—$, wherein the ratio of each oxide to the other is for example 1–99 to 99–1; (4) heteric-homo block units for example $$—(EtO)_a—(EtO—PrO)_b—$$
$$—(EtO)_a—(PrO)_b—(EtO—PrO)_c—$$
$$—(EtO—PrO)_a—(BuO)_b—$$

etc, where $—EtO—$, $—PrO—$, $—BuO—$ are units derived from ethylene, propylene, and butylene oxides respectively.

—(OA)$_n$— can also be derived from an oxetane (e.g., α-γ alkylene oxides), for example those of the formula

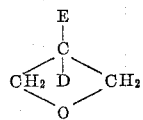

where E and D are hydrogen or a substituted radical, for example alkyl, aryl, cycloalkyl, alkenyl, aralkyl, etc.

In addition E and D can be substituted, such as where the oxetane is derived from pentaerythritol and derivatives thereof. Examples of such oxetanes can be found in the American Chemical Society Monogram "The Pentaerythritols" by Berlow et al. (Reinhold 1958) Chapter X. Preferred embodiments of such pentaerythritol derived oxetanes include those of the formula

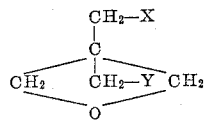

where X and Y are halogen, cyano, hydroxy and alkoxy.

Since the products of this invention may be block polymers containing blocks or segments of alkylene oxide units which are added sequentially, oxyalkylation is in essence a stepwise procedure. For the sake of simplicity of presentation, the invention will be illustrated by employing as a base oxyalkylatable resin Q(OH)$_q$ and by employing only ethylene, propylene, and butylene oxides with the understanding that other hydrophobe oxides (i.e. other than ethylene oxide) can be used in place of propylene and butylene oxides such as amylene oxide, octylene oxide, styrene oxide, oxetanes, etc. These are shown in the following table where Q(OH)$_q$ is the oxyalkylatable resin having $_q$OH groups.

TABLE II

Step I.

(1)   Q[O(EtO)$_a$H]$_q$
(2)   Q[O(PrO)$_a$H]$_q$
(3)   Q[O(BuO)$_a$H]$_q$
(4)   Q[O(MO)$_a$H]$_q$
(5)   Q[O(PrO-BuO)$_a$H]$_q$ (MO=mixture of EtO-PrO for example 1:1, 3:2, 2:3, etc. molar ratio)

Step II.

Reaction of the Step I product with one of the five oxides or mixtures employed in Step I, which oxide had not been reacted in the immediately preceding step, to give for example:

(6)    Q[O(EtO)$_a$(PrO)$_b$H]$_q$
(7)    Q[O(EtO)$_a$(BuO)$_b$H]$_q$
(8)    Q[O(EtO)$_a$(MO)$_b$H]$_q$
(9)    Q[O(EtO)$_a$(PrO-BuO)$_b$H]$_q$
(10)   Q[O(PrO)$_a$(EtO)$_b$H]$_q$
(11)   Q[O(PrO)$_a$(BuO)$_b$H]$_q$
(12)   Q[O(PrO)$_a$(MO)$_b$H]$_q$
(13)   Q[O(PrO)$_a$(Pro-BuO)$_b$H]$_q$
(14)   Q[O(BuO)$_a$(EtO)$_b$H]$_q$
(15)   Q[O(BuO)$_a$(PrO)$_b$H]$_q$
(16)   Q[O(BuO)$_a$(MO)$_b$H]$_q$
(17)   Q[O(BuO)$_a$(PrO-BuO)$_b$H]$_q$
(18)   Q[O(MO)$_a$(EtO)$_b$H]$_q$
(19)   Q[O(MO)$_a$(PrO)$_b$H]$_q$
(20)   Q[O(MO)$_a$(BuO)$_b$H]$_q$
(21)   Q[O(MO)$_a$(PrO-BuO)$_b$H]$_q$
(22)   Q[O(PrO-BuO)$_a$(EtO)$_b$H]$_q$
(23)   Q[O(PrO-BuO)$_a$(PrO)$_b$H]$_q$
(24)   Q[O(PrO-BuO)$_a$(BuO)$_b$H]$_q$
(25)   Q[O(PrO-BuO)$_a$(MO)$_b$H]$_q$

Step III.

The products of Step II can be reacted with one of the five epoxides or mixture of oxides which had not been reacted in the immediately preceding step, i.e. either EtO, PrO, BuO, MO, or PrO-BuO, with the above exclusion as to the epoxide just reacted. This will be illustrated as follows:

(26)   Q[O(EtO)$_a$(PrO)$_b$(EtO)$_c$H]$_q$
(27)   Q[O(EtO)$_a$(PrO)$_b$(BuO)$_c$H]$_q$
(28)   Q[O(EtO)$_a$(PrO)$_b$(MO)$_c$H]$_q$
(29)   Q[O(EtO)$_a$(PrO)$_b$(PrO-BuO)$_c$H]$_q$
(30)   Q[O(EtO)$_a$(BuO)$_b$(EtO)$_c$H]$_q$
(31)   Q[O(EtO)$_a$(BuO)$_b$(PrO)$_c$H]$_q$
(32)   Q[O(EtO)$_a$(BuO)$_b$(MO)$_c$H]$_q$
(33)   Q[O(EtO)$_a$(BuO)$_b$(PrO-BuO)$_c$H]$_q$
(34)   Q[O(EtO)$_a$(MO)$_b$(EtO)$_c$H]$_q$
(35)   Q[O(EtO)$_a$(MO)$_b$(PrO)$_c$H]$_q$
(36)   Q[O(EtO)$_a$(MO)$_b$(BuO)$_c$H]$_q$
(37)   Q[O(EtO)$_a$(MO)$_b$(PrO-BuO)$_c$H]$_q$
(38)   Q[O(EtO)$_a$(PrO-BuO)$_b$(EtO)$_c$H]$_q$
(39)   Q[O(EtO)$_a$(PrO-BuO)$_b$(PrO)$_c$H]$_q$
(40)   Q[O(EtO)$_a$(PrO-BuO)$_b$(BuO)$_c$H]$_q$
(41)   Q[O(EtO)$_a$(PrO-BuO)$_b$(MO)$_c$H]$_q$
(42)   Q[O(PrO)$_a$(EtO)$_b$(PrO)$_c$H]$_q$
(43)   Q[O(PrO)$_a$(EtO)$_b$(BuO)$_c$H]$_q$
(44)   Q[O(PrO)$_a$(EtO)$_b$(MO)$_c$H]$_q$
(45)   Q[O(PrO)$_a$(EtO)$_b$(PrO-BuO)$_c$H]$_q$
(46)   Q[O(PrO)$_a$(BuO)$_b$(EtO)$_c$H]$_q$
(47)   Q[O(PrO)$_a$(BuO)$_b$(PrO)$_c$H]$_q$
(48)   Q[O(PrO)$_a$(BuO)$_b$(MO)$_c$H]$_q$
(49)   Q[O(PrO)$_a$(BuO)$_b$(PrO-BuO)$_c$H]$_q$
(50)   Q[O(PrO)$_a$(MO)$_b$(EtO)$_c$H]$_q$
(51)   Q[O(PrO)$_a$(MO)$_b$(PrO)$_c$H]$_q$
(52)   Q[O(PrO)$_a$(MO)$_b$(BuO)$_c$H]$_q$
(53)   Q[O(PrO)$_a$(MO)$_b$(PrO-BuO)$_c$H]$_q$
(54)   Q[O(PrO)$_a$(PrO-BuO)$_b$(EtO)$_c$H]$_q$
(55)   Q[O(PrO)$_a$(PrO-BuO)$_b$(PrO)$_c$H]$_q$
(56)   Q[O(PrO)$_a$(PrO-BuO)$_b$(BuO)$_c$H]$_q$
(57)   Q[O(PrO)$_a$(PrO-BuO)$_b$(MO)$_c$H]$_q$
(58)   Q[O(BuO)$_a$(EtO)$_b$(PrO)$_c$H]$_q$
(59)   Q[O(BuO)$_a$(EtO)$_b$(BuO)$_c$H]$_q$
(60)   Q[O(BuO)$_a$(EtO)$_b$(MO)$_c$H]$_q$
etc.

Step IV involves the oxyalkylation of the products of Step III. Step V involves the oxyalkylation of Step IV. Further oxyalkylations involve Steps VI–X or higher. This process can be continued ad infinitum.

Depending on the particular application, one may combine a large or small amount of alkylene oxide to the resin. Thus, one may combine the alkylene oxide to the resin in mole ratios of 1:1 or less to 1000:1 or more such as 1–100, for example 1–50, but preferably 1–20. However, it should be understood that the preferred ratio will vary as to the particular application, the particular alkylene oxide, the particular ratios of the oxide, etc.

Sulfur analogues of the alkylene oxides can also be employed. Thus, Q(OH)$_q$ can be oxyalkylated with alkylene oxide, alkylene sulfide, or mixtures of alkylene oxide and alkylene sulfide in a random or block-wise fashion. The following compounds are exemplary:

$$Q[-O-(CH_2-CH_2S)-_aH]_q$$

$$Q[-O-(CH_2-\underset{\underset{CH_3}{|}}{C}HS)_a-H]_q$$

$$Q[-O-(-CH_2-CH_2S)_a-(CH_2-CH_2O-)_bH]_q$$

$$Q[-O-(CH_2-CH_2O)_a-(CH_2-CH_2S)_b-H]_q$$

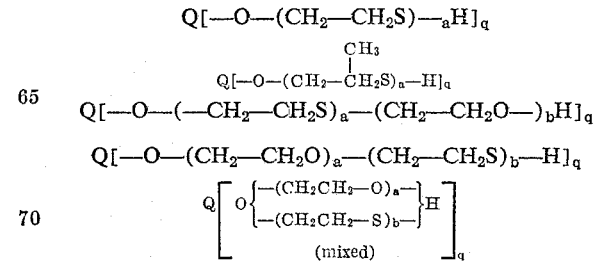

U.S. Patent No. 2,499,370 recites in detail, with examples, the procedure used to produce oxyalkylated derivatives of resins by reacting a phenolic resin with an oxyalkylating agent. Reference is therefore made to said patent in regard to such description. The (b)-series examples in said patent show specific details of the general oxyalkylation procedure as applied to phenolic resins.

U.S. Patent No. 2,605,230, to De Groote, dated July 29, 1952, contains an especially comprehensive statement of oxypropylation, in its Part 1. Said Part 1 of said patent, from its beginning down to its Example 1a, is therefore incorporated herein, by reference, further to illustrate oxyalkylation procedure.

With respect to the hazards attendant on the use of glycid in oxyalkylation, attention is called to the statement appearing in U.S. Patent No. 2,602,062, to De Groote, dated July 1, 1052, at column 4, line 50, through column 5, line 20 thereof. Said passage is likewise incorporated herein, by reference.

Oxyalkylation of the resins of Part 1 above is so conventional a procedure that it is necessary only to mention a few points concerning it. It is preferable to oxyalkylate the resins in the presence of sufficient inert solvent to produce a solution of low viscosity at oxyalkylation temperatures. An aromatic solvent such as xylene is a suitable solvent of this kind.

Before oxyalkylating the resin, it is very desirable to remove as completely as possible any water present in the resin or resin solution, e.g., the water introduced with the oxyalkylation catalyst when the latter is added in dissolved form, such as sodium hydroxide solution. Such water removal may be accomplished by heating the resin mass until the water has volatilized.

In general the present resins are oxyalkylated according to the procedures employed in oxyalkylating phenolaldehyde resins.

The following are given as non-limiting examples of suitable oxyalkylation procedures.

EXAMPLE 1

An autoclave is charged with the basic dehydrated resin product of Example A. It is then sealed and swept with nitrogen; and propylene oxide is then introduced at a temperature of about 125–130° C., as rapidly as the resin will accept it without forcing the pressure above about 50 p.s.i.g. A total of 3.2 parts of weight of propylene oxide per part of resin is so introduced.

Since oxyalkylation procedures are so well described in the literature and so well known to those skilled in the art, to save repetitive details the oxyalklations carried out in accord with this invention are presented in the following table, which lists the resin employed and the name and parts by weight of alkylene oxide added per part of resin. The parts by weight of resin are determined on a solvent free basis. Where more than alkylene oxide is added, the order of addition is indicated by reading from left to right. For example, in Examples 2, Resin A is first oxyalkylated with 3.2 parts of PrO and then 0.5 parts of EtO per part of initial resin.

TABLE III

| Example | Resin of Example | Parts by Weight Added/Part Resin | |
|---|---|---|---|
| | | Propylene Oxide | Ethylene Oxide |
| 1 | A | 3.2 | |
| 2 | A | 3.2 | 0.5 |
| 3 | A | 3.2 | 1.0 |
| 4 | A | 3.2 | 2.0 |
| 5 | A | 3.2 | 3.0 |
| 6 | A | 5.8 | |
| 7 | A | 5.8 | 0.5 |
| 8 | A | 5.8 | 1.0 |
| 9 | A | 5.8 | 2.0 |
| 10 | A | 5.8 | 3.0 |
| 11 | A | 7.1 | |
| 12 | A | 7.1 | 1.5 |
| 13 | A | 7.1 | 3.0 |
| 14 | A | 7.1 | 3.5 |
| 15 | A | 8.9 | |
| 16 | A | 8.9 | 1.5 |
| 17 | A | 8.9 | 2.5 |
| 18 | A | 8.9 | 3.5 |
| 19 | A | 11.2 | |
| 20 | A | 11.2 | 2 |
| 21 | A | 11.2 | 3 |
| 22 | A | 11.2 | 4 |
| 23 | A | 11.2 | 5 |
| 24 | A | 11.2 | 6 |
| 25 | A | 13.9 | |
| 26 | A | 13.9 | 4 |
| 27 | A | 13.9 | 5 |
| 28 | A | 13.9 | 6 |
| 29 | A | 13.9 | 7 |
| 30 | A | | 0.5 |
| 31 | A | | 1.0 |
| 32 | A | | 2.0 |
| 33 | A | | 4.0 |
| 34 | A | | 6.0 |
| 35 | A | 3.2 | |
| 36 | B | 3.2 | 2.0 |
| 37 | B | 3.2 | 3.0 |
| 38 | B | 3.2 | 4.0 |
| 39 | B | 3.2 | 5.0 |
| 40 | B | 5.7 | |
| 41 | B | 5.7 | 1.5 |
| 42 | B | 5.7 | 3.0 |
| 43 | B | 7.7 | 4.0 |
| 44 | B | 7.1 | |
| 45 | B | 7.1 | 1.0 |
| 46 | B | 7.1 | 2.0 |
| 47 | B | 7.1 | 4.0 |
| 48 | B | 7.1 | 6.0 |
| 49 | B | 8.9 | |
| 50 | B | 8.9 | 1 |
| 51 | B | 8.9 | 2.0 |
| 52 | B | 8.9 | 4.0 |
| 53 | B | 8.9 | 6.0 |
| 54 | B | 11.0 | |
| 55 | B | 11.0 | 1 |
| 56 | B | 11.0 | 2 |
| 57 | B | 11.0 | 4 |
| 58 | B | 11.0 | 6 |
| 59 | B | 11.0 | 9 |
| 60 | B | 14.0 | |
| 61 | B | 14.0 | 1 |
| 62 | B | 14.0 | 2 |
| 63 | B | 14.0 | 4 |
| 64 | B | 14.0 | 6 |
| 65 | B | 14.0 | 8 |
| 66 | B | 14.0 | 10 |
| 67 | C | 3.2 | |
| 68 | C | 3.2 | 1.5 |
| 69 | C | 3.2 | 2.5 |
| 70 | C | 3.2 | 3.5 |
| 71 | C | 3.2 | 4.5 |
| 72 | C | 4.6 | |
| 73 | C | 4.6 | 2.0 |
| 74 | C | 4.6 | 3.0 |
| 75 | C | 4.6 | 4.0 |
| 76 | C | 4.6 | 5.0 |
| 77 | C | 5.8 | |
| 78 | C | 5.8 | 1.5 |
| 79 | C | 5.8 | 2.5 |
| 80 | C | 5.8 | 3.5 |
| 81 | C | 5.8 | 4.5 |
| 82 | C | 7.1 | |
| 83 | C | 7.1 | 1.0 |
| 84 | C | 7.1 | 2.0 |
| 85 | C | 7.1 | 4.0 |
| 86 | C | 7.1 | 6.0 |
| 87 | C | 8.9 | |
| 88 | C | 8.9 | 1.0 |
| 89 | C | 8.9 | 2.0 |
| 90 | C | 8.9 | 4.0 |
| 91 | C | 8.9 | 6.0 |
| 92 | C | 11.1 | |
| 93 | C | 11.1 | 1.0 |
| 94 | C | 11.1 | 3.0 |
| 95 | C | 11.1 | 5.0 |
| 96 | C | 11.1 | 7.0 |
| 97 | C | 11.1 | 9.0 |
| 98 | C | 14.0 | |
| 99 | C | 14.0 | 1.0 |
| 100 | C | 14.0 | 2.0 |
| 101 | C | 14.0 | 4.0 |
| 102 | C | 14.0 | 6.0 |
| 103 | C | 14.0 | 8.0 |
| 104 | C | 14.0 | 10.0 |
| 105 | C | 14.0 | 12.0 |
| 106 | C | 18.8 | |
| 107 | C | 18.8 | 1.0 |
| 108 | C | 18.8 | 4.0 |
| 109 | C | 18.8 | 6.0 |
| 110 | C | 18.8 | 8.0 |
| 111 | C | 18.8 | 10.0 |
| 112 | C | 18.8 | 10.0 |
| 113 | C | 18.8 | 12.0 |

TABLE III—Continued

| Example | Resin of Example | Ratio PrO/EtO | Parts |
|---|---|---|---|
| 114 | D | 1:2 | 0.4 |
| 115 | D | 1:2 | 0.8 |
| 116 | D | 1:2 | 1.5 |
| 117 | D | 1:2 | 3.0 |
| 118 | D | 1:2 | 4.0 |
| 119 | D | 1:1 | 0.4 |
| 120 | D | 1:1 | 0.8 |
| 121 | D | 1:1 | 1.5 |
| 122 | D | 1:1 | 3.0 |
| 123 | D | 1:1 | 4.0 |
| 124 | D | 2:1 | 0.4 |
| 125 | D | 2:1 | 0.8 |
| 126 | D | 2:1 | 1.5 |
| 127 | D | 2:1 | 3.0 |
| 128 | D | 2:1 | 4.0 |
| 129 | A | 1:2 | 0.4 |
| 130 | A | 1:2 | 0.8 |
| 131 | A | 1:2 | 1.5 |
| 132 | A | 1:2 | 2.5 |
| 133 | A | 1:1 | 0.4 |
| 134 | A | 1:1 | 1.0 |
| 135 | A | 1:1 | 2.0 |
| 136 | A | 1:1 | 2.5 |
| 137 | A | 3:2 | 0.4 |
| 138 | A | 3:2 | 0.8 |
| 139 | A | 3:2 | 1.5 |
| 140 | A | 3:2 | 2.5 |

TABLE IV

| Example | Resin of Example | Butylene Oxide | Styrene Oxide | Ethylene Oxide |
|---|---|---|---|---|
| 141 | A | 3 | | 1 |
| 142 | A | 3 | | 2 |
| 143 | A | 3 | | 3 |
| 144 | A | 3 | | 5 |
| 145 | A | 7 | | 1 |
| 146 | A | 7 | | 2 |
| 147 | A | 7 | | 4 |
| 148 | A | 7 | | 6 |
| 149 | A | 7 | | 8 |
| 150 | A | | 2 | 1 |
| 151 | A | | 2 | 2 |
| 152 | A | | 2 | 4 |
| 153 | A | | 4 | 1 |
| 154 | A | | 4 | 2 |
| 155 | A | | 4 | 4 |
| 156 | A | | 4 | 6 |
| 157 | A | | 4 | 8 |
| 158 | C | 4.1 | | 1 |
| 159 | C | 4.1 | | 2 |
| 160 | C | 4.1 | | 3 |
| 161 | C | 4.1 | | 4 |
| 162 | C | 4.1 | | 6 |
| 163 | C | 8 | | 2 |
| 164 | C | 8 | | 4 |
| 165 | C | 8 | | 6 |
| 166 | C | 8 | | 8 |
| 167 | C | 8 | | 12 |
| 168 | C | | 2 | 1 |
| 169 | C | | 2 | 2 |
| 170 | C | | 2 | 3 |
| 171 | C | | 2 | 4 |
| 172 | C | | 6 | 1 |
| 173 | C | | 6 | 2 |
| 174 | C | | 6 | 3 |
| 175 | C | | 6 | 5 |
| 176 | C | | 6 | 7 |
| 177 | C | | 6 | 10 |
| 178 | C | | 10 | 1 |
| 179 | C | | 10 | 3 |
| 180 | C | | 10 | 5 |
| 181 | C | | 10 | 7 |
| 182 | C | | 10 | 10 |
| 183 | C | | 10 | 15 |

TABLE V.—OXYALKYLATED POLYOL RESINS

| Example | Resin of Example | PrO | EtO | BuO | Styrene Oxide |
|---|---|---|---|---|---|
| 184 | E | 3.5 | | | |
| 185 | E | 6.1 | 2.0 | | |
| 186 | E | 7.3 | | | |
| 187 | E | 7.3 | 1.9 | | |
| 188 | E | 11.5 | | | |
| 189 | E | 11.5 | 2.1 | | |
| 190 | E | 14.2 | 4.6 | | |
| 191 | E | | | 3.3 | |
| 192 | E | 15.0 | 5.3 | 1.5 | |
| 193 | E | | | | 2.0 |
| 194 | F | 2.5 | | | |
| 195 | F | 3.9 | 2.2 | | |
| 196 | F | 8.5 | 2.7 | | |
| 197 | F | 13.2 | 4.9 | | |
| 198 | F | | 6.7 | | |
| 199 | F | 18.6 | 7.2 | | |
| 200 | F | 21.5 | 9.3 | 2.5 | |
| 201 | F | | | 4.5 | |
| 202 | F | 4.5 | | | 1.5 |

Since the products of this invention have terminal hydroxyl groups, these groups can be further reacted with any compound capable of reacting therewith.

Examples of such compounds include the following:
(1) Polyepoxides.
(2) Glycidyl compounds, such as unsaturated glycidyl ethers, for example glycidyl allyl ether, glycidyl hydrocarbon ethers, for example glycidyl isopropyl ether, glycidyl phenyl ether, etc., glycidyl amine such as glycidyl dialkyl amino methane of the formula

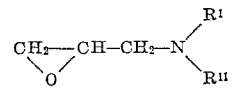

when $R + R^{11}$ are alkyl groups, etc.

(3) Alkylene imines such as ethylene imine, propyleneimine, higher alkyleneimines.
(4) Ethers prepared from alcohols or their equivalent, such as alkyl sulfate, alkyl halides, etc.
(5) Esters prepared from monocarboxyl acid as acetic, benzoic, etc., acid for example an acid of the formula

where Z comprises a saturated or unsaturated alkyl radical, a cycloalkyl radical or an aromatic radical. The polycarboxyl esters may be full esters or fractional esters, i.e. where free carboxylic acid group is present in the molecule.

Polycarboxylic acid can advantageously be employed and its structure can be varied widely. In general, they can be expressed as

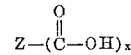

where Z comprises a saturated or unsaturated aliphatic radical, a cycloaliphatic radical, an aromatic radical, and the like, and $x$ is a whole number equal to 2 or more, for example, 2–4, but preferably 2.

Examples of the polycarboxylic acids comprise those of the aliphatic series, for example, oxalic, malonic, succinic, glutaric, adipic, pimelic, suberic, azelaic, sebacic nonanedicarboxylic acid, decanedicarboxylic acids, undecanedicarboxylic acids, and the like.

Examples of unsaturated aliphatic polycarboxylic acids comprise fumaric, maleic, mesaconic, citraconic, itaconic, muconic, aconitic acids, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and other poly acids, for example, dilinoleic acid, trilinoleic acid, polylinoleic acid, and the like such as those prepared by Emery Industries. Other polycarboxylic acids comprise those containing ether groups, for example, diglycolic acid. Mixtures of the above acids can be advantageously employed.

In addition, acid precursors such as esters, anhydrides, glycerides, etc. can be employed in place of the free acid.

Esters were prepared from the oxyalkylated resins described in the preceding examples using the following general procedure. 200 grams of resin (on a solvent free basis) are added to a 3-necked round bottom flask equipped with a stirrer thermometer, Dean-Stark trap and condenser, and heated with an electric heating mantle. Sometimes additional aromatic solvent was added if the oxyalkylated resin contained only a small amount. The base containing oxyalkylated resin was neutralized with CHI (generally 2-4 ml.) and then the esterifying acid was added. The mixture was heated to about 190° C. and held at this temperature for six hours while removing water of reaction. In addition some solvent was lost.

In the following examples, 200 g. of oxyalkylated resin of the indicated example was neutralized and then reacted with the indicated amount of the indicated acid anhydride along the procedure outlined above. The amount of water removed is also shown.

TABLE VI.—ESTERS

| Ex. | Product of Example | Acid or Anhydride | Acid or Anhydride (g.) | Water Removed (g.) |
|---|---|---|---|---|
| 203 | 4 | Diglycolic Acid | 6.7 | 4.3 |
| 204 | 4 | ----do---- | 13.4 | 5.5 |
| 205 | 4 | ----do---- | 20.1 | 5.6 |
| 206 | 5 | ----do---- | 6.0 | 5.0 |
| 207 | 5 | ----do---- | 12.0 | 7.0 |
| 208 | 5 | ----do---- | 18.0 | 8.0 |
| 209 | 13 | ----do---- | 4.0 | 3.5 |
| 210 | 13 | ----do---- | 8.0 | 4.5 |
| 211 | 13 | ----do---- | 12.0 | 5.0 |
| 212 | 14 | ----do---- | 3.4 | 3.6 |
| 213 | 14 | ----do---- | 6.7 | 4.3 |
| 214 | 14 | ----do---- | 10.1 | 5.0 |
| 215 | 20 | ----do---- | 2.7 | 3.5 |
| 216 | 20 | ----do---- | 8.0 | 3.5 |
| 217 | 26 | ----do---- | 2.4 | 3.5 |
| 218 | 26 | ----do---- | 4.8 | 4.0 |
| 219 | 26 | ----do---- | 7.2 | 4.5 |
| 220 | 27 | ----do---- | 2.4 | 3.5 |
| 221 | 27 | ----do---- | 4.7 | 4.0 |
| 222 | 27 | ----do---- | 7.0 | 4.0 |
| 223 | 28 | ----do---- | 2.0 | 3.0 |
| 224 | 28 | ----do---- | 4.0 | 3.5 |
| 225 | 28 | ----do---- | 6.0 | 4.0 |
| 226 | 29 | ----do---- | 2.0 | 2.0 |
| 227 | 29 | ----do---- | 4.0 | 2.5 |
| 228 | 29 | ----do---- | 6.0 | 2.5 |
| 229 | 29 | ----do---- | 10.0 | 2.5 |
| 230 | 26 | Maleic Anhydride | 1.8 | 1.8 |
| 231 | 26 | ----do---- | 3.5 | 1.9 |
| 232 | 26 | ----do---- | 5.3 | 1.8 |
| 233 | 27 | ----do---- | 1.7 | 3.0 |
| 234 | 27 | ----do---- | 3.3 | 2.0 |
| 235 | 27 | ----do---- | 5.0 | 2.0 |
| 236 | 28 | ----do---- | 1.5 | 2.0 |
| 237 | 28 | ----do---- | 2.9 | 2.5 |
| 238 | 28 | ----do---- | 4.4 | 2.5 |
| 239 | 29 | ----do---- | 1.5 | 2.5 |
| 240 | 29 | ----do---- | 2.9 | 3.0 |
| 241 | 29 | ----do---- | 4.4 | 3.0 |
| 242 | 26 | Phthalic Anhydride | 2.7 | 2.5 |
| 243 | 26 | ----do---- | 5.3 | 2.6 |
| 244 | 26 | ----do---- | 8.0 | 2.3 |
| 245 | 27 | ----do---- | 2.5 | 2.5 |
| 246 | 27 | ----do---- | 5.0 | 2.5 |
| 247 | 27 | ----do---- | 7.5 | 3.0 |
| 248 | 28 | ----do---- | 2.2 | 2.0 |
| 249 | 28 | ----do---- | 4.4 | 2.5 |
| 250 | 28 | ----do---- | 6.6 | 2.0 |
| 251 | 29 | ----do---- | 2.2 | 2.5 |
| 252 | 29 | ----do---- | 4.4 | 2.5 |
| 253 | 29 | ----do---- | 6.6 | 2.5 |
| 254 | 135 | Diglycolic Acid | 13.4 | 6.0 |
| 255 | 135 | ----do---- | 26.8 | 8.5 |
| 256 | 135 | ----do---- | 40.2 | 11.0 |

Oxetane oxyalkylates are prepared from the polymers of this invention under acidic conditions. Since the polymer itself is prepared under acidic conditions, it is oxyalkylated with oxetane without prior treatment with a base. Therefore, the resin is not made basic prior to oxyalkylation but the acid employed in preparing the resin itself is employed as a catalyst for oxyalkylation.

Oxetane oxyalkylation is carried out in the well known conventional manner.

EXAMPLES

To one part of the resin of Example A (except that the addition of base is omitted) is added 5 parts of dimethyl oxetane

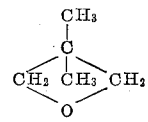

at a temperature of 100° C. for a period of two hours.

The process is repeated with each of the resins of Examples B, C, D, E and F.

Oxetane oxyalkylates are also prepared by reacting in each case five parts of dichloromethyl oxetane

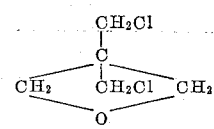

with 1 part of the resin of Examples A, B, C, D, E and F.

*Breaking and preventing water-in-oil emulsions*

This phase of the invention relates to the use of the oxyalkylated products of the present invention in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

They also provide an economical and rapid process for separating emulsions which have been prepared under controlled conditions from mineral oil, such as crude oil and relatively soft waters of weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Miscellaneous solvents, such as pine oil, carbon tetrachloride, sulfur dioxide extract obtained in the refining of petroleum, etc., are often employed as diluents. Similarly, the material or materials employed as the demulsifying agent of our process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibits relatively limited oil-solubility. However, since such reagents are frequently used in a ratio of 1 to 10,000, or 1 to 20,000, or 1 to 30,000, or even 1 to 40,000 or 1 to 50,000, as in desalting practice, such an apparent insolubility in oil and water is not significant, because said reagents undoubtedly have solubility within such concentrations.

In practicing the process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like. However, with extremely difficult emulsions higher concentrations of demulsifier can be employed.

In many instances the oxyalkylated products herein specified as demulsifiers can be conveniently used without dilution. However, as previously noted, they may be diluted as desired with any suitable solvent. Selection of the solvent will vary, depending upon the solubility characteristics of the oxyalkylated product, and, of course will be dictated in part by economic consideration, i.e., cost. The products herein described are useful not only in diluted form but also admixed with other chemical demulsifiers.

In recent years pipe line standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasal sludge, and has little if any oil in the water phase.

The following examples show results obtained in the resolution of crude petroleum emulsions obtained from various sources.

EXAMPLES

This example illustrates the use of products of this invention for the demulsification of a California oil which is difficult to treat. This emulsion (Standard Oil of California, Oxnard Plains field, Maulhardt Lease, No. 4 well) contains 24% water and the free oil has an API gravity of 26.9. This emulsion can be resolved most effectively by the use of the products of Examples 47, 59 and 105 using a treating temperature of 140° F. One part of the demulsifier (as a 50% solution in aromatic solvent) was capable of resolving 16,000 parts of emulsion to give bright oil and the draw-off water is clean by visual inspection. These three compounds as tested were 40% better than the demulsifier presently in use in this field. Other ompositions of this invention were also capable of treating of the emulsion.

In a similar fashion it was found that the products of Examples 84, 94 and 110 were most effective in resolving the emulsion in the Little Buffalo Field, Wyoming (an American Oil Co., LBB Unit Cheyenne 045855, Embar Zone, well #31) which contained 45% water.

Example 123 was effective in resolving the emulsion in the Shuler Field at El Dorado, Arkansas (Lion Oil Co., Shuler Unit #108). This emulsion contains 40% water.

The product of Example 190 was found to be effective in treating an emulsion (Newhall-Potrero, Sunray Oil Co., Rancho, San Francisco, Battery #1, Low Trap #4) containing 5% of water.

The above examples are merely presented to illustrate demulsification employing the compositions of this invention. Other compositions shown above were effective with other emulsions from other oil fields.

OTHER USES

The compositions of this invention may also be employed as follows:

(1) In addition to their use as water-in-oil demulsifiers, certain species of this invention can be employed as oil-in-water demulsifiers.

(2) Emulsifying agents and wetting agents.

(3) Detergents and dispersing agents.

(4) Additives for primary oil recovery and secondary water flood operations.

(5) Additives for both synthetic and petroleum lube oils, fuel oils and the like.

(6) Other uses which make use of the surfactant properties of the products, including those properties listed above, i.e. emulsifying, wetting, detergent, dispersion, etc. properties.

Having thus described my invention what I claim as new and desire to obtain by Letters Patent is

1. An oxyalkylated polymer containing m-dioxane units prepared by reacting
  (I) the polymeric reaction product of
    (a) an unsaturated m-dioxane and
    (b) a member selected from the group consisting of
      (1) a phenolic compound,
      (2) a polyol, and
      (3) a mixture of (1) and (2)
  with
  (II) an oxyalkylating agent, the ratio of number of moles of I to the number of moles of II being 1:1 to 1:1000.

2. The oxyalkylated polymer of claim 1 wherein (a) of I is the reaction product of acrolein and pentaerythritol.

3. The oxyalkylated polymer of claim 2 wherein (b) of I is p-tert-butyl-phenol, the molar ratio of (b) to (a) being 3:2.

4. The oxyalkylated polymer of claim 2 wherein (b) of I is p-tert-butyl-phenol, the molar ratio of (b) to (a) being 4:3.

5. The oxyalkylated polymer of claim 2 wherein (b) of I is polypropylene glycol, the molar ratio of (b) to (a) being 4:3.

6. The oxyalkylated polymer of claim 2 wherein (b) of I is a mixture of polyethylene glycol and p-tert-amyl-phenol, the molar ratio of polyethylene glycol to p-tert-amyl-phenol to (a) being 2:2:3.

7. The oxyalkylated polymer of claim 1 wherein (a) of I is the reaction product of crotonaldehyde and pentaerythritol.

8. The oxyalkylated polymer of claim 7 wherein (b) of I is p-tert-butyl-phenol, the molar ratio of (b) to (a) being 3:2.

9. The oxyalkylated polymer of claim 7 wherein (b) of I is p-tert-butyl-phenol, the molar ratio of (b) to (a) being 4:3.

References Cited by the Examiner

UNITED STATES PATENTS

| | | | |
|---|---|---|---|
| 2,499,365 | 3/1950 | De Groote | 260—47 |
| 2,914,484 | 11/1959 | Monson et al. | 252—331 |
| 2,915,499 | 12/1959 | Wilson | 260—47 |
| 2,915,500 | 12/1959 | Wilson | 260—47 |
| 2,915,501 | 12/1959 | Guest | 260—47 |
| 2,944,979 | 7/1960 | De Groote | 252—331 |
| 3,022,273 | 2/1962 | Guest | 260—47 |

FOREIGN PATENTS 507,224  11/1954  Canada.

WILLIAM H. SHORT, *Primary Examiner.*

J. C. MARTIN, C. A. WENDEL, *Assistant Examiners.*